(No Model.) 3 Sheets—Sheet 1.

M. IMMISCH.
DYNAMO ELECTRIC MACHINE AND MOTOR.

No. 381,789. Patented Apr. 24, 1888.

WITNESSES:
C. A. Weed.
A. Hitchcock.

INVENTOR:
M. Immisch
By J. C. Somes
ATTORNEY.

(No Model.) 3 Sheets—Sheet 2.

M. IMMISCH.
DYNAMO ELECTRIC MACHINE AND MOTOR.

No. 381,789. Patented Apr. 24, 1888.

WITNESSES:
C. H. Speed.
A. Hitchcock.

INVENTOR:
M. Immisch
By F. C. Somes
ATTORNEY.

(No Model.)  M. IMMISCH.  3 Sheets—Sheet 3.
DYNAMO ELECTRIC MACHINE AND MOTOR.
No. 381,789.  Patented Apr. 24, 1888.

WITNESSES:  INVENTOR:

UNITED STATES PATENT OFFICE.

MORITZ IMMISCH, OF LONDON, COUNTY OF MIDDLESEX, ENGLAND.

DYNAMO-ELECTRIC MACHINE AND MOTOR.

SPECIFICATION forming part of Letters Patent No. 381,789, dated April 24, 1888.

Application filed December 23, 1886. Serial No. 222,378. (No model.) Patented in England March 2, 1886, No. 2,956; in France March 24, 1886, No. 174,998, and in Belgium March 25, 1886, No. 72,498.

*To all whom it may concern:*

Be it known that I, MORITZ IMMISCH, a subject of the Emperor of Germany, residing at 119 Torriano Avenue, London, in the county of Middlesex, England, have invented new and useful Improvements in Electromotors and Dynamo-Machines, (for which I have obtained a patent in Great Britain, No. 2,956, dated March 2, 1886; France, No. 174,998, dated March 24, 1886, and Belgium, No. 72,498, dated March 25, 1886,) of which the following is a specification, reference being had to the accompanying drawings, in which—

Figure 1:
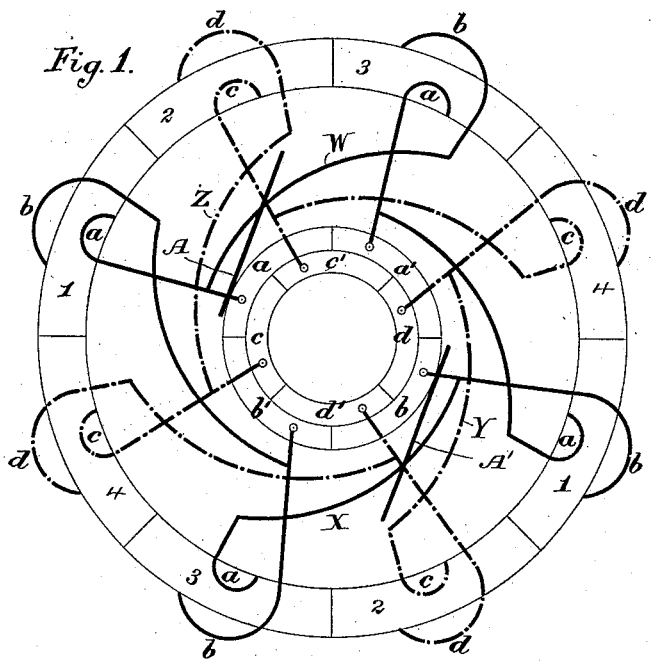
Figure 2:
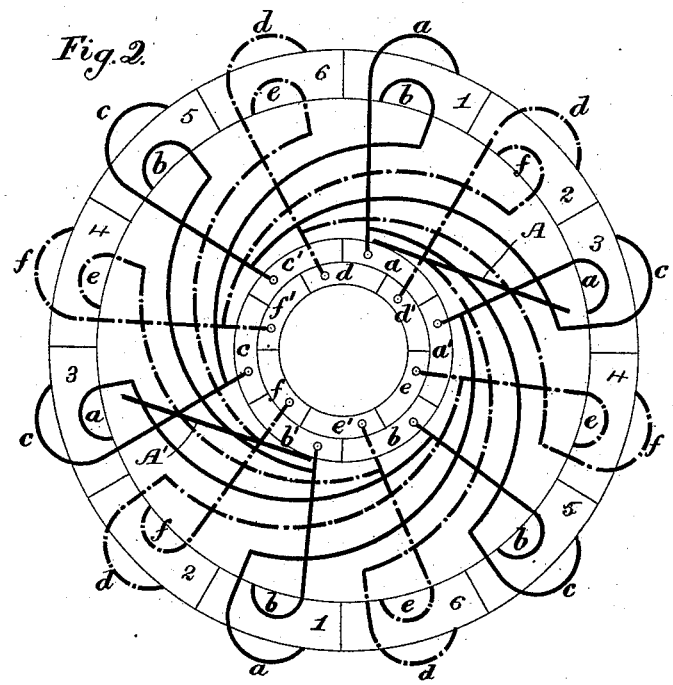
Figure 3:
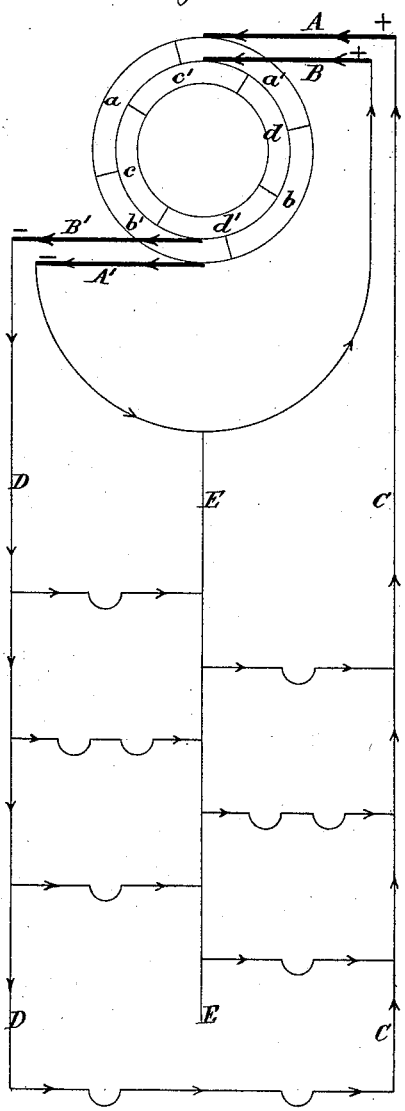
Figure 4:
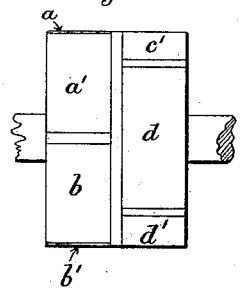
Figure 5:
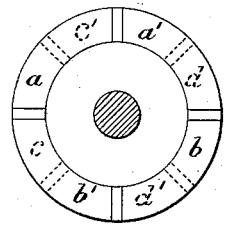

Figure 1 is a diagram of a four-coil armature embodying my improvements, the two sets of commutator-segments being represented out of their normal relative positions, and one within the other, in order that both may be seen in the same figure. Fig. 2 is a diagram of a six-coil armature embodying my improvements, the commutator-segments being arranged as shown in Fig. 1, for the purpose of better illustration. Fig. 3 is a diagram showing two sets of coils in series with each other, each set having its own pair of brushes. Fig. 4 is a side view of the commutator, showing the two sets of commutator-segments in their proper relative positions. Fig. 5 is an end view of the commutator shown in Fig. 4. Figs. 6 to 9 illustrate a suitable switch for placing the two halves of the armature in series or in parallel.

Similar letters of reference indicate corresponding parts in the different figures.

This invention relates to the employment of a double commutator, such as is described in my previous patent, No. 327,797, dated October 6, 1885, for purposes other than those mentioned in such patent. Whereas in that patent the double commutator was applied to a system of three or more open circuits, the present invention consists in applying such double commutator to armatures with closed circuits, such as are commonly used in the well-known Gramme and Siemens armatures, without reference to any special number of coils. The object which I thereby attain is to form in an armature two separate and distinct circuits, which circuits can be put either in series or in parallel. When in series, such an arrangement enables me to apply what is known as "Edison's three-wire system" to a single dynamo-machine. When the arrangement is applied to electromotors, it enables me to vary the power of the machine by increasing or diminishing its internal resistance in putting the two halves in series or in parallel with each other.

The operation can be performed by a suitable switch, the construction of which at once suggests itself to any practical electrician, and a suitable form of which will be hereinafter described.

In order that my invention may be better understood, I will now proceed to explain the same by means of the annexed drawings.

The commutator is the same as that described in my former patent, and is illustrated in Figs. 4 and 5 of the drawings, which represent a commutator for use with an armature having four coils, the same as shown in Fig. 1 of the drawings. In Figs. 1, 2, and 3 the two sets of commutator-segments are shown one within the other, so as to enable both sets to be seen in the same figure, and also the positions they occupy in relation to each other. There are double the number of commutator-segments that there are coils in the armature, and such segments are divided into two sets or series, $a$ $a'$ and $b$ $b'$ being in one set, and $c$ $c'$ and $d$ $d'$ in the other set, the two sets having an angular displacement in relation to each other, such that the line of division between two segments in one series is opposite the middle of a segment in the other series—that is to say, the line of division between segments $a'$ and $b$ in one set is opposite the middle of segment $d$ in the other set, and the other segments are similarly arranged in relation to each other.

The ends of each coil are connected to consecutive segments in the same series, like in the ordinary Gramme or Siemens machines; but as there are two series of segments the whole of the coils form two distinct sets, the coils of which sets may be wound either one on the top of the other or side by side. Fig. 1 shows the mode of connecting the ends of the two sets of coils to the commutator as applied to an armature having four coils. Fig. 2 shows the connection as applied to an armature having six coils. These figures show that the ends of each coil are connected to consecutive segments in the same series. The lettering of the coils and segments will enable the connections to be readily followed. Part of each coil is wound on one section of the armature and the other part of such coil is wound on another section of the armature. For instance, it will be seen that coil $a$ in Figs. 1 and 2 is wound partly on the section of the armature marked 1 and partly on the section marked 3; but the two parts are connected so as to form only one coil, and the other coils are similarly arranged.

In Fig. 1 it will be seen that one end of coil $a$ is connected to segment $a$, while its other end is connected to segment $a'$—that is, the consecutive or adjacent segment in the same series. One end of coil $b$ is connected to the next consecutive or adjacent segment in the same series—viz., $b$—and its other end to the remaining segment $b'$ in such series. Two of the four coils (viz., $a$ and $b$) are thus connected to consecutive segments in the same set of segments, and as these two coils are also connected together, as shown by the lines W and X, they form a closed circuit and constitute one half of the armature. The ends of coil $c$ are connected to the consecutive segments $c$ and $c'$ in the second set of segments, and the ends of coil $d$ to the consecutive segments $d$ and $d'$ in such second set, and as these coils $c$ and $d$ are connected together, as shown, by lines Y and Z, they form a separate or second closed circuit, constituting the other half of the armature, the two halves being separate and distinct and having no connection with each other.

The system may be looked upon as a duplicated form of ordinary machines, each half having its own commutator. To place the two sets of coils in parallel, I employ only two single brushes overbridging the two series of commutator-segments. The positive brush A is shown as resting on segments $a$ and $c$, and the negative brush A' on segments $b$ and $d$, so that as coils $a$ and $c$ belong to different halves of the armature and coils $b$ and $d$ also to different halves of the armature, and the coils $a$ and $b$ are connected together, while the coils $c$ and $d$ are similarly connected together, it will be seen that the two halves of the armature are connected in parallel.

The description of the connections above given with reference to Fig. 1 will enable those of Fig. 2 to be at once followed, as they are identical, only that in the latter figure an armature having six coils is illustrated, so that there will be three coils in each half of the armature, the coils in one half being connected together and to consecutive segments in one set of commutator-segments, while those of the other half are similarly connected together and to consecutive segments in the other set of commutator-segments.

To put the two sets of coils in series with each other I divide each brush into two, as illustrated in Fig. 3, so that each set of coils has its own pair of brushes, A A' being the pair for one set, and B B' the pair for the other set. By connecting the brushes A and B' or B and A' the two sets of coils will be put in series with each other, while the brushes not connected form the terminals of the machine.

When applying Edison's three-wire system to a machine of this kind, the wires C and D are connected to the terminals from the main leads, while the third or compensating wire, E, is connected to either of the brushes not forming terminals, or to the metallic connection between such brushes.

Figure 6:
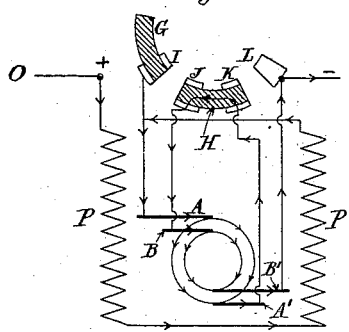
Figure 7:
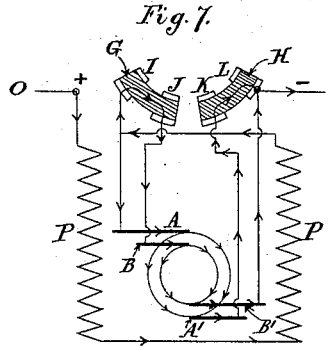
Figure 8:
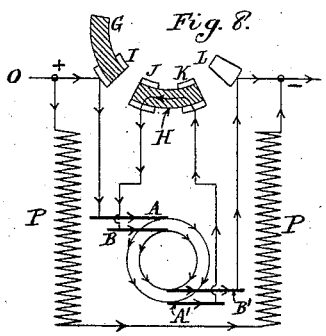
Figure 9:
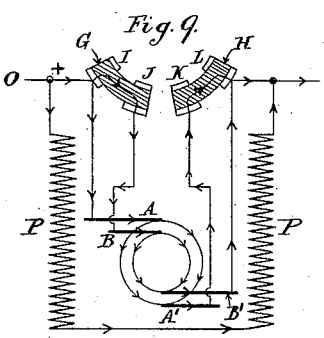

A suitable form of switch for effecting the placing of the two halves of the armature in series or in parallel is illustrated in Figs. 6, 7, 8, and 9, Figs. 6 and 7 showing its application to a series-wound motor or dynamo, and Figs. 8 and 9 showing its application to a shunt-wound motor or dynamo. The parts G and H (marked with section-lines in all these figures) represent the movable part of the switch, while the parts I, J, K, and L represent the fixed parts of the switch to which the two halves of the armature are connected.

In Figs. 6 and 7 it will be seen that the positive brush A is connected to the fixed part I of the switch, while the other positive brush, B, is connected to fixed part J. One negative brush, A', is connected with fixed part K, and the other negative brush, B', with the fixed part L, the brushes A and A' resting on one set of commutator-segments and B and B' on the other set. The field-coils P P are connected to brush A. In Fig. 6 the movable part G of the switch is in contact with fixed part I only, while movable part H connects or rests upon the two fixed parts J and K. Under these conditions it will be seen by the direction of the arrows that (supposing the machine to be a motor) a current entering at O passes first through the field-coils P P; thence to brush A through one half of the armature to brush A'; thence to fixed part K, and through movable part H to fixed part J; then to brush B through the other half of the armature, to brush B', and so to fixed part L, whence it is taken off. It will thus be seen that the two halves of the armature are connected in series.

In Fig. 7 the movable parts G and H are shown shifted, so that G connects the fixed parts I and J, and H connects the fixed parts K and L. In this position the current entering at O, after passing through the field-coils as before, divides itself, one part passing directly to brush A and so through one half of the armature, while the other part passes to fixed part I; then by movable part G to fixed part J; thence to brush B and through the other half of the armature. The negative brushes A' and B' being connected to the parts K and L, which are overbridged by movable part H, it will be seen that the two halves of the armature are thus connected in parallel. It will be noticed that the shifting of the switch does not affect the field.

In Figs. 8 and 9 one end of the field-coils is connected to fixed part I, and the latter is also connected to brush A, and the other end is connected to fixed part L, which is also connected to brush B'. The fixed part J is connected to brush B and fixed part K to brush A'. In Fig. 8 movable part G rests on fixed part I, while movable part H rests upon or connects fixed parts J and K. Under these conditions a current entering at O divides itself, one part passing through the field-coils direct to fixed part L, while the other passes by fixed part I to brush A through one half of the armature to brush A', thence to fixed part K, and by movable part H to fixed part J, and so to brush B, and through the other half of the armature by brush B' to fixed part L, whence it is taken off. The two halves of the armature are thus connected in series. In Fig. 9 the movable parts G and H are shown shifted, so that G connects I and J, and H connects K and L. The current entering at O will, as before, divide itself, one part passing through the field-coils directly to fixed part L, while the other part will pass to fixed part I; but as the latter is now connected to J by movable part G the current will again divide itself, one part passing to brush A through one half of the armature to brush A', thence to fixed part K, and by movable part H to fixed part L, while the other part passes through movable part G from I to J, thence to brush B, and so through the other half of the armature to brush B', and thence to fixed part L, whence it is taken off. It will thus be seen that the two halves of the armature are connected in parallel. Figs. 8 and 9 refer to a shunt-wound machine, (as before stated,) and it will be seen that, as in the case of the series-wound machine, (previously described with reference to Figs. 6 and 7,) the field is not affected by the shifting of the switch.

What I claim as my invention, and desire to secure by Letters Patent, is—

1. The combination of an armature for dynamo-electric generators, the coils of said armature being connected to form two continuously-closed circuits, two commutators, the segments of which are disposed in alternation, connections extending from alternating armature-coils to one commutator, and similar connections between the remaining coils and the segments of the other commutator, and commutator-brushes bearing separately upon the alternate commutator-terminals of both armature-circuits, substantially as described.

2. The combination of an armature for dynamo-electric generators, the coils of which are connected to form two continuously-closed circuits, a double commutator, the segments of which are arranged in alternation, connections extending from alternating armature-coils to one portion of the commutator, and similar connections extending from the remaining coils to the segments of the other portion of the commutator, and separate commutator-brushes for each portion of the commutator, said brushes bearing upon the alternate commutator-terminals of the respective armature-circuits and adapted to be connected in series or parallel, substantially as described.

MORITZ IMMISCH.

Witnesses:
 WALTER J. SKERTEN,
 CHAS. A. ALLISON.